L. L. GILLILAND.
Meat-Cutter.
No. 208,233.  Patented Sept. 24, 1878.
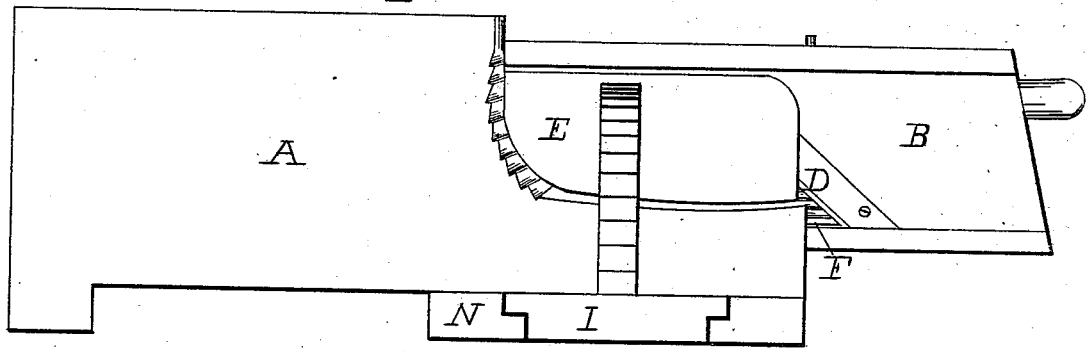
Fig. I
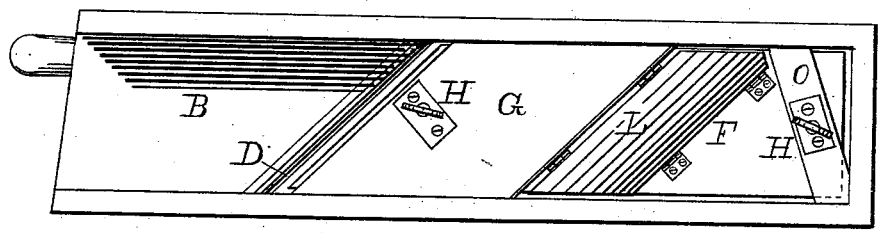
Fig. II
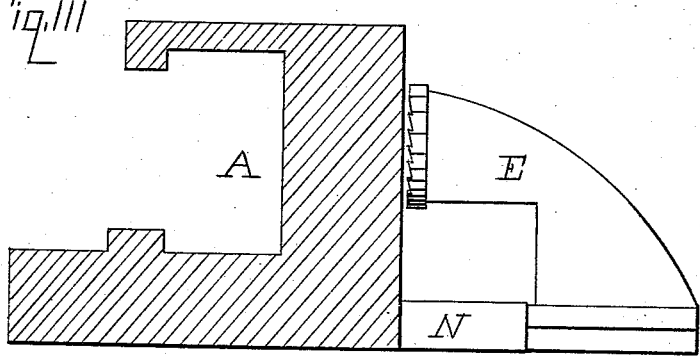
Fig. III
Witnesses.
Frank Conover
B. Pickering
Inventor,
Lewis L. Gilliland

UNITED STATES PATENT OFFICE.

LEWIS L. GILLILAND, OF DAYTON, OHIO.

IMPROVEMENT IN MEAT-CUTTERS.

Specification forming part of Letters Patent No. 208,233, dated September 24, 1878; application filed May 22, 1878.

*To all whom it may concern:*

Be it known that I, LEWIS L. GILLILAND, of Dayton, in the county of Montgomery and State of Ohio, have invented new and useful Improvements in Meat-Cutters, of which the following is a specification:

The nature of my invention consists in an improved device for feeding the meat to the cutter, and an improvement in the adjusting device for regulating the thickness of the slice.

In the accompanying drawing, in which similar letters of reference indicate like parts, Figure I is a side elevation of the meat-cutter. Fig. II is a back view of the cutter. Fig. III is a cross-section of the frame and exhibits the feeding device.

A represents the frame, which is supported on cleats. The cleats N have grooves to sustain the feeding device. The cutter B is supported in grooves on the back side of the frame, which are shown at Fig. III.

In Fig. I the cutter is withdrawn sufficiently to exhibit a portion of the knife D and serrated adjustable board F. The cutter B is composed of a frame with a board attached to the front end, on which is a handle, and to the forward end of which is attached the cutting blade or knife D. (Shown in both Figs. I and II.) To the back of the cutter-frame are two braces, G and O. To each of these are attached plates H, which hold the adjusting-screws. These screws engage nuts, which are attached to the serrated board F. The board L is hinged, by a pair of hinges, to each, the brace G and the serrated board F, and thus is held the serrated adjustable board in position within the cutting-frame, the thumb-screws serving to carry the board to and fro, to regulate the thickness of the slice. The object of hinging diagonally is to keep the adjusting-board in line with the cutter-frame, and preserve an equal distance between it and the knife. The serrations on the adjustable board are horizontal, with the face of the serrations upward, to hold the meat against the downward tendency of the knife. The platform has an irregular curved surface well adapted to the form of meat, and this surface is serrated with a view to holding the meat in the most secure manner, the faces fronting the direction of the force resulting from the process of cutting.

E is a feeding-plate, supported on an arm attached to the slide I. This plate has serrations on its inner surface, which extend obliquely across its face, with the face of the serrations upward, these faces antagonizing the movement of the knife.

The meat is fed to the machine by hand until the piece becomes thin; then it is carried forward by the feeding device.

The operation is described thus: First, adjust the adjusting-board by the screws on the back of the cutting-frame. Then place the meat on the serrated platform and press it with the left hand against the adjusting-board, the right hand carries the cutter forward and cleaves a thickness of the meat, and the operation is continued until the piece is nearly cut away. Then the feeding device is used to avoid injury to the hand.

What I claim as my invention is—

The adjustable serrated board F of the cutter B, in combination with the braces G and O, the hinged board L, constructed, arranged, and operated substantially as described.

LEWIS L. GILLILAND.

Witnesses:
FRANK CONOVER,
B. PICKERING.